Figure 1:
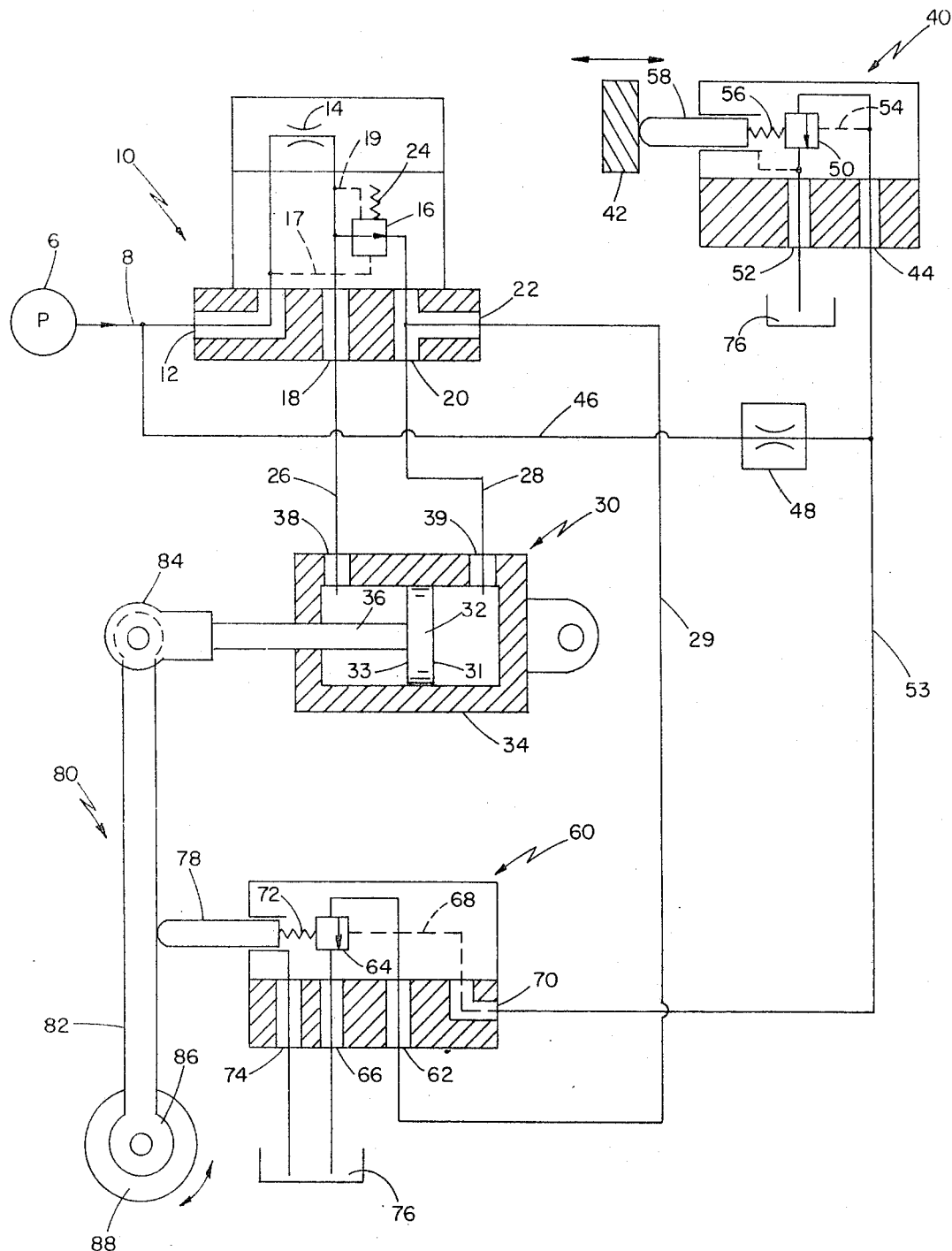

United States Patent [19]
Denker

[11] 3,872,773
[45] Mar. 25, 1975

[54] POSITION CONTROLLING
[75] Inventor: James M. Denker, Scituate, Mass.
[73] Assignee: Nutron Corporation, Hingham, Mass.
[22] Filed: Aug. 9, 1972
[21] Appl. No.: 279,004

[52] U.S. Cl. .................. 91/388, 91/186, 91/417, 91/461
[51] Int. Cl. ............................................ F15b 13/16
[58] Field of Search ....................................... 91/388

[56] References Cited
UNITED STATES PATENTS

| | | | |
|---|---|---|---|
| 2,974,639 | 3/1961 | O'Connor et al. | 91/388 |
| 3,494,257 | 2/1970 | Welk, Jr. et al. | 91/388 |
| 3,583,285 | 6/1971 | Johnson | 91/388 |
| 3,706,263 | 12/1972 | Johnson | 91/388 |

Primary Examiner—Paul E. Maslousky

[57] ABSTRACT

A fluid system for controlling the position of an output according to the position of an input and comprising a first variable flow control valve including a sensor arranged for sensing the position of the input and operative for generating a first fluid pressure signal dependent on the input position, a second variable flow control valve connected to the first valve and including a sensor arranged for sensing the position of the output and operative to produce a second fluid pressure signal dependent on the output position and on the first pressure signal, and an output positioner connected to the output and the second control valve and responsive to the second fluid pressure signal for changing the position of the output in response to changes in the second fluid signal.

20 Claims, 2 Drawing Figures

3,872,773

POSITION CONTROLLING

This invention relates to position controlling.

It is a primary object of the present invention to provide a high-gain fluid system for controlling the position of a selected output according to the position of an input. Other objects include providing such systems, which are inexpensive, simple and reliable, to which the output is either directly or indirectly coupled, and which compare fluidic signals dependent on the respective positions of the input and output and generate a resulting signal to cause movement of the output.

The invention features a fluid control system comprising first and second variable control valves including respective sensors arranged for sensing the position of the input and output, and an output positioner operative for changing the position of the output, the first valve being operative for generating a first fluid pressure signal dependent on the input position, the second valve being connected to the first and being operative for generating a second fluid pressure signal dependent on the first signal and on the output position, and the output positioner being responsive to changes in the second signal. In preferred emoodiments, each control valve includes a variable orifice piloted by the first pressure signal and controlled also by, respectively, forces directly dependent on the input and output positions, the positioner includes an actuator having surfaces of different working areas and exposed, respectively, to the second pressure signal and to another pressuure signal, the ratio of the two pressure signals at balance inverse to that of the areas of which they work, and the positioner further comprises one of a hydraulic actuator directly coupled to the outlet and a control valve indirectly coupled to the output and arranged for controlling flow of fluid from an independent fluid source to the output.

Figure 2:
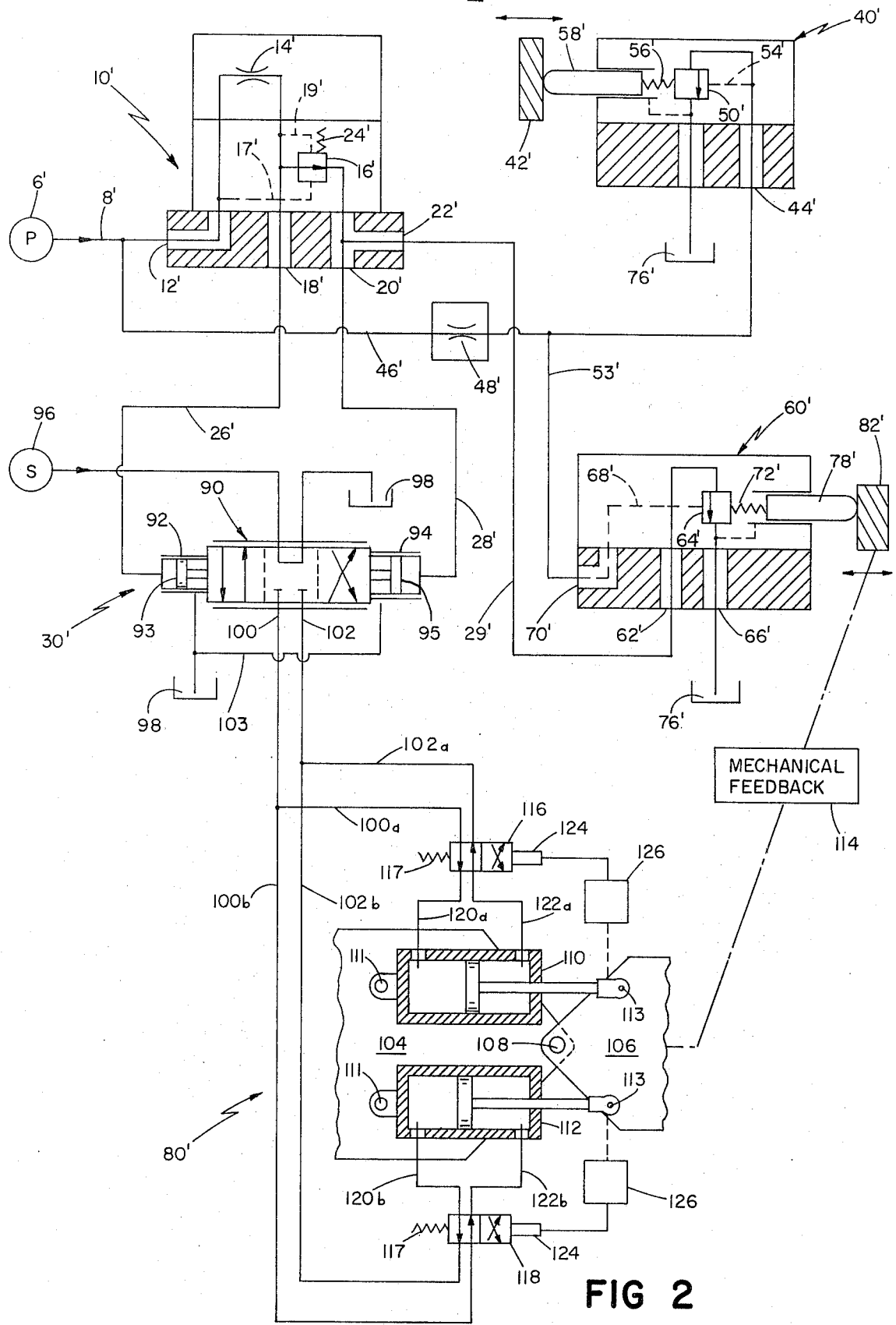

Other objects, features, and advantages will appear from the following detailed description of preferred embodiments of the invention, taken together with the attached drawings, in which:

FIG. 1 is a schematic view of a first system embodying the present invention; and, FIG. 2 is a schematic view of a second system embodying the present invention.

Referring more particularly to FIG. 1, there is shown a position control system comprising an inlet valve 10, an output position controller comprising an actuator 30, an input control valve 40, an output feedback valve 60, and output assembly 80. As described hereinafter, the system is operable to control the position of output assembly 80 in response to changes in the position of an input member 42 engaging input control valve 40.

Inlet valve 10 includes an inlet 12 connected by a fluid line 8 to a pilot fluid pressure source 6, an internal fixed orifice 14, a variable orifice 16 connected to the downstream side of orifice 14, and three outlets, designated 18, 20, and 22, respectively. As shown, one side of the pilot piston of variable orifice 16 is connected by pilot line 17 to the upstream side of fixed orifice 14; the other side by pilot line 19 to th downstream side of the fixed orifice. A bias spring 24 acts on the same side of the pilot piston as does downstream pilot line 19.

Outlet 18 is connected to the downstream side of fixed orifice 11. A fluid line 26 extends from outlet 18 to actator 30. Outlets 20 and 22 are connected to the downstream side of variable orifice 16. Fluid lines 28, 29 connect outlets 20, 22, to, respectively, actuator 30 and feedback control valve 60.

Actuator 30 comprises a piston 32 within a cylinder 34 and having a piston rod 36 extending axially through one end of the cylinder. The area of the side 31 of piston 32 opposite piston rod 36 is twice that of the side 33 to which rod 36 is attached. Fluid line 26 is connectd to an inlet 38 at the smaller area side of actuator 33; fluid line 28 to inlet 39 at the larger area side.

Feedback control valve 60 includes an inlet 62 connected to fluid line 29, and an internal variable orifice 64 between inlet 62 and drain outlet 66. One side of the pilot piston of variable orifice 64 is connected by a pilot line 68 to a pilot outlet 70. A compression spring 72 having a spring constant $K_f$ bears against the other side of the pilot piston. A leakage drain 74 extending from spring 72 is, together with drain outlet 66, connected to fluid reservoir 76. An output piston 78 is slidably mounted in a cylindrical hole in a side of valve 60 with its inner end bearing against an end of spring 72 and its outer end engaging a rocker arm 82 of output assembly 80. As shown, rocker arm 82 is pivotally connected at one end 84 to piston rod 36 of actuator 30. The other end 86 of rocker arm 82 is connected to the output member 88 whose position is to be controlled.

A fluid line 53 extends from pilot outlet 70 of valve 60 to inlet 44 of input control valve 40. A fluid line 46 including a fixed orifice 48 extends from pilot pressure line 8 to pilot line 53.

As shown, control valve 40 includes a variable orifice 50 connecting inlet 44 to an outlet 52, which is connected in turn to reservoir 76. A pilot line 54 extends from one side of the pilot piston of orifice 50 to the upstream side of the orifice, intermediate the orifice and inlet 44. A compression spring 56 of spring constant $K_c$ bears against the other side of the pilot piston. An input piston 58 is slidably mounted in a cylindrical hole in one end of valve 40 with the inner end thereof bearing against the adjacent end of spring 56 and the outer end thereof engaging input member 42.

In operation, supply fluid from constant pressure source 6, at pressure $P_i$, is introduced into valve 10 through inlet 12 and passes through fixed orifice 14, which drops its pressure to $P_1$. Fluid at pressure $P_1$ flows out outlet 18 and thence through line 26 to inlet 38 of actuator 30; and also passes through variable orifice 16, which drops its pressure to $P_2$. Fluid at pressure $P_2$ exits from valve 10 through outlets 20 and 22. The fluid from outlet 20 passes through line 28 to inlet 39 of actuator 30; that from outlet 22 through line 29 to inlet 62 of feedback control valve 60.

The fluid at pressure $P_1$ from line 26 acts on the smaller area side 33 of piston 32. That at pressure $P_2$ from line 29 acts on the larger area side 31 of the piston. To balance the piston, the ratio of pressures, $P_{1:2}$, must equal the inverse ratio of the areas on which they work, or, since the area of side 31 is twice that of side 33, $P_1$ for balance must be twice $P_2$.

In valve 60, the fluid from inlet 62 at pressure $P_2$ is throttled by variable orifice 64 and flows from outlet 66 to reservoir 76 at atmospheric pressure. The back pressure of variable orifice 64 maintains the pressure $P_2$, and the magnitude of $P_2$ depends on the balance between the forces exerted on the opposite sides of the pilot piston of the orifice. At balance, the force exerted on one side of the piston by spring 72 must equal that exerted on the other side of the piston by pilot pressure fluid, at pressure $P_3$, in pilot line 68.

Pressure $P_3$ is generated by a small flow passing from source 6 through line 46 and fixed orifice 48, which drops the pressure from $P_1$ to $P_3$, to pilot line 53. Line 53 extends between and connects outlet 70 of feedback control valve 60 and inlet 44 of input control valve 40. At input valve 40, fluid at pressure $P_3$ from line 46 is introduced into inlet 44, flows through a variable orifice 50 which throttles the flow, and exits from valve outlet 52 to reservoir 76 at atmospheric pressure. Pressure $P_3$ is maintained by the back pressure of orifice 50, and its magnitude depends on the forces exerted on the opposite sides of the pilot piston of the orifice. At balance, the force on one side of the piston from spring 56 equals that on the other side by fluid at pressurue $P_3$.

As it is apparent the force exerted by spring 56 depends on the position of input plunger 58. To change the position of output assembly 80, input 42 is moved to displace plunger 58, thereby changing the position of the variable orifice pilot piston and resulting in a change in pressure $P_3$. The change in pressure $P_3$, in turn, causes the piston of variable orifice 64 of feedback control valve 60 to move with a corresponding change in pressure $P_2$. The change in pressurue $P_2$ results in piston 32 becoming unbalanced and moving piston rod 36 and output assembly 80. Output plunger 78 of feedback control valve 60 follows the movement of output assembly rocker arm 82, changing the force exerted by spring 72 on the pilot piston of variable orifice 64 as required to restore the balance across variable orifice 64. When the balance is restored, pressure $P_2$ is restored to its original level and piston 32 is again balanced, though in a new position.

As the pilot areas of the pistons of variable orifices 64 and 50 of valves 60 and 40 are the same, as are the spring constants of springs 56 and 72, any motion of input plunger 58 will result in plunger 78 being moved an identical distance in the same direction.

FIG. 2 illustrates a second system embodying the present invention and intended for controlling the position of a large load. Many portions of the FIG. 2 system correspond to portions of the system of FIG. 1 and are identified by the same reference numeral, with a diffferentiating prime ( ' ) added thereto. Thus, the FIG. 2 system includes an inlet valve 10', an input control valve 40', and an output feedback valve 60', all substantially identical to their counterparts in the system of FIG. 1, and a modified output position controller and output assembly 80'.

Output position controller +'comprises three position, four-way tandem center proportional valve 90 having control operators 92, 94 mounted at each end thereof. Operator 92 is connected to line 26', operator 94 to line 28'. The area of the working piston 93 of operator 92 is one half that of piston 95 of operator 94. As shown, one side of valve 90 is connected to a constant flow supply source 96 and reservoir 98; the other side to lines 100, 102 leading to output assembly 80'. A drain line 103 leads from each solenoid 92, 94 to reservoir 98.

Output assembly 80' includes a pair of plates 104, 106 connected by a kingpin 108 and a pair of actuators 110, 112 for pivoting the plates relative to each other. The cylinder end 111 of each actuator 110 112 is pivotally connected to plate 104; the piston end 113 is pivotally connected to plate 106. A mechanical feedback system, schematically indicated at 114, connects plate 106 and the output member 82' engaging output piston 78' of output feedback valve 60'. In one particular embodiment, plates 104, 106 are the two portions of a large, heavy, articulated steering vehicle, mechanical feedback system 114 and output member 82' comprise a cam assembly responsive to the pivotal movement of the articulated portions, and input member 42' is a steering lever.

A pair of four-way, two-position valves, designated 116, 118 connect actuators 110, 112 to output position controller. As shown, each of lines 100, 102 includes two branches, designated 100a, 100b and 102a, 102b respectively. Branches 100a, and 102b to one side of valve 116; branches 100b, 102b to one side of valve 118. The other sides of valves 116, , 118 are connected by lines 120a, 122a and 120b, 122b to, respectively, opposite sides of actuators 110, 112. Each of valves 116 118 are biased by springs 117 toward the position shown. Operators 124 are provided to shift the valves to their other position. Each of operators 124 is controlled by a respective pilot control system 126 to change the position of the respective valve 116, 118 when, during the relative pivoting of plates 104, 106 the piston of the actuator 110, 112 associated with the particular valve passes over kingpin 108.

The operation of the heavy duty system of FIG. 2 is similar to that previously described with reference to the FIG. 1 system. Movement of input member 42' displaces input control valve plunger 58', causing resulting changes in pressure $P'_3$ (in lines 53' and 68' ) and pressure $P'_2$ ( in lines 28' and 29' ). The change in pressure $P'_2$ unbalances the operators 92, 94 controlling proportional valve 90 of output position controller 30', causing working fluid from source 96 to flow through valve 90 to actuators 110, 112 of output assembly 80' and pivot plates 104, 106 relative to each other. The movement of plates 104, 106 moves output member 82', through mechanical feedback 114, until the balance across variable orifice 64' is restored, pressure $P'_2$ is returned to its original level, and the valve 90 of output position controller 30' is again balanced.

Other embodiments within the scope of the following claims will occur to those skilled in the art.

What is claimed is:

1. A fluid system for controlling the position of an output according to the position of an input, said system comprising:

a first variable flow control valve including a sensor arranged for sensing the position of said input and operative for generating a a first fluid pressure signal having a magnitude dependent on and varying according to said sensed position a second variable flow control valve connected to said first valve and including a sensor arranged for sensing the position of said output, said second control valve being operative for generating a second fluid pressure signal having a magnitude dependent on and varying according to said sensed position of said output and said first fluid pressure signal;

an output position controller connected to said output and said second control valve, said controller being responsive to said second fluid pressure signal and operative for changing the position of said output in response to changes in said second fluid pressure signal; and, an inlet valve having a fixed orifice, a piloted variable orifice in series with said fixed orifice, an inlet adapted for connection to a fluid source and arranged for directing flow from said source through said fixed orifice, a first flow conduit extending from intermediate said fixed and variable orifices to a first outlet, a second flow conduit for directing flow from the downstream side of said variable conduit to a second outlet, each of said first and second outlets being connected to said controller, and first and second pilot flow conduits extending from opposite sides of a pilot piston of said variable orifice to, respectively, the upstream and downstream sides of said fixed orifice.

2. The fluid system of claim 1 wherein
said controller has a pair of fluid control surfaces, and is responsive to said second fluid pressure signal and operative for changing the position of said output in response to changes in said second fluid pressure signal; and,
said inlet valve is connected to said controller and to said second control valve for applying fluid at a first pressure to one of said surfaces and fluid at a second pressure to the other of said surfaces, said second pressure bearing a predetermined relationshhip to and varying according to said second fluid pressure signal.

3. The system of claim 1 wherein said surfaces are of different areas, and the ratio of said first pressure to said second pressure is equal to the ratio of the area of said one surface to that of said other surfaces when said system is balanced.

4. The system of claim 1 wherein said second pressure is said second fluid pressure signal and said first pressure is greater than said second pressure.

5. The system of claim 1 wherein each of said first and second flow control valves in a piloted variable flow valve having a respective pilot port, and including a pilot conduit connecting the pilot parts of said each of said first and second flow controls valves, fluid within said pilot conduit providing pilot pressure for piloting said each of said valves.

6. The system of claim 5, wherein said pilot pressure is said first pressure signal.

7. The system of claim 5 wherein said pilot pressure tends to open said control valves and the respective sensor of each of said valves exerts force tending to close said each valve.

8. The system of claim 7 wherein each of said control valves includes a pilot piston, said pilot pressure acts on one side of said piston, and said sensor of said each valve includes a compression spring acting on an opposite side of said piston.

9. The system of claim 12 wherein said springs of said valves have the same spring constant.

10. The system of claim 1 wherein said second control valve comprises a piloted variable control valve having an inlet connected to said second flow conduit of said inlet valve, a pilot port connected to said first control valve, and a pilot flow conduit for applying said first pressure signal to a side of said pilot piston.

11. The system of claim 10 wherein said first control valve comprises a piloted flow valve having an inlet connected to said pilot port of said second control valve, a pilot piston, and a pilot flow conduit for applying said first pressure signal to a side of said first control valve pilot piston.

12. The system of claim 11 wherein the sensor of each of said control valves includes a compression spring having one end thereof engaging a side of the pilot piston of said each valve, and a sensing member movable with respect to the both of said valve in response to movement of a respective one of said input and said output engaging the other end of said compression spring.

13. The system of claim 12, whrein said controller includes a having a pair of fluid control surfaces, a first inlet for applying fluid under pressure to one of said surfaces and a second inlet for applying fluid under pressure to the other of said surfaces, and said system includes means connecting said first controller inlet to said first flow conduit of said inlet valve and means connecting said second controller inlet to said second flow conduit of said inlet valve.

14. The system of claim 13 wherein said surfaces are of unequal area.

15. The system of claim 14 wherein said springs of said control valves have the same spring constant.

16. A fluid system for controlling the position of an output, said system comprising:
an output position controller connected to said output and having a pair of fluid control surfaces of different areas and a pair of fluid ports;
control valving including an inlet adapted for connection to a constant pressure fluid supply source, an outlet,
a fixed orifice connectecd between an in series with said inlet and said outlet,
a piloted variable orifice connected in series with said fixed orifice on the downstream side thereof and between and in series with said inlet and said outlet,
a first controller flow conduit extending from intermediate said fixed and variable orifices to said actuator and arranged for applying fluid to the one of said pair of control surfaces having the lesser area,
a second controller flow conduit extending from the downstream side of said variable orifice to said controller and arranged for applying fluid to other of said pair of control surfaces,
first and second pilot flow conduits extending from opposite sides of a pilot piston of said variable orifice to, respectively, the upstream and downstream sides of said fixed orifice; and,
a variable orifice connected in series with said outlet for adjusting flow therethrough to control the position of said output.

17. The system of claim 16, wherein said controller comprises a hydraulic piston and cylinder, one of said piston and cylinder is coupled to said output for moving said output in response to movement of said one, and said surfaces are opposite sides of said piston.

18. The system of claim 16 wherein said controller is adapted for connection to a fluid source and is operative for applying fluid from said last-mentioned source to said output and for varying to flow of fluid from said last-mentioned source to said output in response to changes in flow through said variable orifice.

19. The system of claim 18 wherein said controller includes a four-way proportional valve and said surfaces are coupled to said valve for changing the position of said valve in response to said changes in flow.

20. The fluid system of claim 16 including an input sensor for sensing the position of an input, said input sensor being connected to said variable orifice connected in series with said outlet being operative for adjusting fluid flow through in response to said sensed position.

* * * * *

UNITED STATES PATENT OFFICE
CERTIFICATE OF CORRECTION

PATENT NO. : 3,872,773
DATED : March 25, 1975
INVENTOR(S) : James M. Denker

It is certified that error appears in the above-identified patent and that said Letters Patent are hereby corrected as shown below:

Column 1, line 31, "pressuure" should be --pressure--,
line 51, after "and" insert --an--,
line 61, "th" should be --the--;

Column 3, line 5, "P1" should be --$P_1$--,
line 49, after "controller" insert --30'--,
line 51, "+'" should be --30'--;

Column 4, line 12, after "controller" insert --30'--,
claim 1, line 52, delete "a" (first occurrence);

Column 5, claim 2, line 26, "relationshhip" should be --relationship--,
claim 5, line 40, "controls" should be --control--;

Column 6, claim 13, line 9, "whrein" should be --wherein--,
claim 13, line 10, after "cludes" delete --a--,
claim 18, line 55, "to" (second occurrence) should be --the--,
claim 19, line 61, after "flow" insert a period(.),
claim 20, line 66, "through" should be --therethrough--

Signed and sealed this 24th day of June 1975.

(SEAL)
Attest:

RUTH C. MASON
Attesting Officer

C. MARSHALL DANN
Commissioner of Patents
and Trademarks